(12) United States Patent
Singh et al.

(10) Patent No.: US 10,049,098 B2
(45) Date of Patent: Aug. 14, 2018

(54) EXTRACTING ACTIONABLE INFORMATION FROM EMAILS

(71) Applicant: Microsoft Technology Licensing, LLC., Redmond, WA (US)

(72) Inventors: Jitendra Singh, Hyderabad (IN); Manoj Kumar Agarwal, Hyderabad (IN)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 15/215,286

(22) Filed: Jul. 20, 2016

(65) Prior Publication Data

US 2018/0024986 A1 Jan. 25, 2018

(51) Int. Cl.
| | | |
|---|---|---|
| *G06F 17/27* | (2006.01) | |
| *G06F 17/21* | (2006.01) | |
| *G06F 17/22* | (2006.01) | |
| *G06F 17/24* | (2006.01) | |
| *G06F 17/30* | (2006.01) | |

(Continued)

(52) U.S. Cl.
CPC ........ *G06F 17/272* (2013.01); *G06F 17/2229* (2013.01); *G06F 17/2247* (2013.01); *G06F 17/248* (2013.01); *G06F 17/277* (2013.01); *G06F 17/2735* (2013.01); *G06F 17/30616* (2013.01); *G06F 17/30625* (2013.01); *G06F 17/30908* (2013.01); *G06Q 10/109* (2013.01);

(Continued)

(58) Field of Classification Search
None
See application file for complete search history.

(56) References Cited

U.S. PATENT DOCUMENTS 6,356,633 B1 * 3/2002 Armstrong .............. H04L 51/14
379/265.04
6,816,885 B1 * 11/2004 Raghunandan ...... G06Q 10/107
709/206

(Continued)

OTHER PUBLICATIONS

Cortez, et al., "Unsupervised Strategies for Information Extraction by Text Segmentation", In Proceedings of Fourth SIGMOD PhD Workshop on Innovative Database Research, Jun. 11, 2010, pp. 49-54.

(Continued)

*Primary Examiner* — Jialong He
(74) *Attorney, Agent, or Firm* — Merchant & Gould P.C.

(57) ABSTRACT

Systems and methods are provided for extracting actionable information from emails in a completely unsupervised manner with no need for the data to be labeled (i.e., the systems and methods do not a human to identify unlabeled or relabeled emails). Changes in the email structure are automatically incorporated to learn new templates through the novel concept of sub-templates. The systems and methods incorporate the minor variations in email structure seamlessly, without needing to introduce new templates. Email templates are computed as permutations of multiple sub-templates in the email, which allows the systems and methods to handle variations in email structure seamlessly and highly efficiently. These systems and methods are extendable to any domain using structured emails, and improve the efficiency of the systems that receive and act on information contained in emails.

19 Claims, 8 Drawing Sheets

(51) Int. Cl.
*H04L 12/58* (2006.01)
*H04L 29/08* (2006.01)
*G06Q 10/10* (2012.01)

(52) U.S. Cl.
CPC .............. *H04L 51/22* (2013.01); *H04L 67/02* (2013.01); *H04L 67/10* (2013.01)

(56) References Cited

U.S. PATENT DOCUMENTS

| | | | | |
|---|---|---|---|---|
| 7,032,174 | B2* | 4/2006 | Montero | G06F 17/273 707/999.001 |
| 8,843,815 | B2 | 9/2014 | Yang et al. | |
| 9,015,153 | B1 | 4/2015 | Zhang | |
| 9,652,530 | B1 | 5/2017 | Bendersky et al. | |
| 2002/0141449 | A1* | 10/2002 | Johnson | G06F 9/546 370/473 |
| 2005/0234844 | A1* | 10/2005 | Ivanov | G06F 17/272 |
| 2006/0224682 | A1 | 10/2006 | Inmon | |
| 2007/0078849 | A1 | 4/2007 | Slothouber | |
| 2009/0125529 | A1* | 5/2009 | Vydiswaran | G06F 17/30864 |
| 2010/0318348 | A1* | 12/2010 | Chelba | G06F 17/271 704/9 |
| 2011/0106892 | A1* | 5/2011 | Nelson | G06Q 10/109 709/206 |
| 2011/0161829 | A1* | 6/2011 | Kristensen | G01C 21/3611 715/739 |
| 2012/0254726 | A1* | 10/2012 | Sandhaus | G06F 17/30911 715/234 |
| 2013/0007648 | A1* | 1/2013 | Gamon | G06Q 10/107 715/771 |
| 2013/0110842 | A1 | 5/2013 | Donneau-Golencer et al. | |
| 2013/0166657 | A1* | 6/2013 | Tadayon | H04M 1/72552 709/206 |
| 2014/0012923 | A1* | 1/2014 | Caldwell | G06Q 10/107 709/206 |
| 2014/0052444 | A1* | 2/2014 | Roberge | G10L 15/08 704/243 |
| 2015/0100877 | A1 | 4/2015 | Long et al. | |
| 2015/0178331 | A1* | 6/2015 | Tyagi | G06F 17/30312 707/736 |
| 2015/0254233 | A1 | 9/2015 | Artzi et al. | |

OTHER PUBLICATIONS

Cerulo, et al., "A Hidden Markov Model to Detect Coded Information Islands in Free Text", In Proceedings of IEEE 13th International Working Conference on Source Code Analysis and Manipulation, Sep. 22, 2013, pp. 157-166.

Kiritchenko, et al., "Email Classification with Co-Training", In Proceedings of Conference of the Centre for Advanced Studies on Collaborative Research, Sep. 30, 2002, 10 pages.

Castro, et al., "Enforcing k-anonymity in Web Mail Auditing", In Proceedings of Ninth ACM International Conference on Web Search and Data Mining, Feb. 22, 2016, pp. 327-336.

Grbovic, et al., "How Many Folders Do You Really Need?: Classifying Email into a Handful of Categories", In Proceedings of 23rd ACM International Conference on Conference on Information and Knowledge Management, Nov. 3, 2014, pp. 869-878.

Zhang, et al., "Annotating Needles in the Haystack without Looking: Product Information Extraction from Emails", In Proceedings of 21th ACM SIGKDD International Conference on Knowledge Discovery and Data Mining, Aug. 11, 2015, pp. 2257-2266.

Liu, et al., "Mining data Records in Web Pages", In Proceedings of Ninth ACM SIGKDD International Conference on Knowledge Discovery and Data Mining, Aug. 24, 2003, pp. 601-606.

Castro, et al., "You've got Mail, and Here is What you Could do With It! Analyzing and Predicting Actions on Email Messages", In Proceedings of Ninth ACM International Conference on Web Search and Data Mining, Feb. 22, 2016, pp. 307-316.

Wendt, et al., "Hierarchical Label Propagation and Discovery for Machine Generated Email", In Proceedings of Ninth ACM International Conference on Web Search and Data Mining, Feb. 22, 2016, pp. 317-326.

Black, et al., "Automated Event Extraction from Email", In Final Report of C5224N/Ling237 Course in Stanford, Jun. 2, 2004, 12 Pages.

"International Search Report and Written Opinion Issued in PCT Application No. PCT/US2017/041814", dated Oct. 5, 2017, 12 Pages.

* cited by examiner

EXTRACTING ACTIONABLE INFORMATION FROM EMAILS

BACKGROUND

Actionable information may be included in emails and labeled as such for the ease of human and mechanical users. Actionable information such as shipment notifications, flight itineraries, credit card payments, bill payments, etc., include information that a recipient is expected to act upon, and are often generated by automated email generators with rich HTML formatting, which label the individual portions of those emails. Users of automated email generators, however, often change the format and layout of their emails and the rich HTML labels thereof, which poses a challenge to automated systems that interact with received emails, such as, for example, personal digital assistants like Siri® or Cortana® (available from Apple Inc., of Cupertino, Calif. and Microsoft Corp., of Redmond, Wash., respectively). Previous solutions involve a human user supervising the automated system's learning process, which requires a human to be signaled and waiting for the human to respond. Signaling a human to initiate a supervised learning process to address format changes in an email introduces inefficiencies into the automated system and methods.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

In this disclosure, systems and methods for extracting actionable information are described. Actionable information is extracted from emails having an HTML format in an unsupervised manner with no need for the data to be labeled (i.e., the systems and methods do not need a human to identify unlabeled or relabeled information items in emails or other communication formats). Changes in the message structure are automatically incorporated to learn new templates through sub-templates. The systems and methods incorporate the minor variations in message structure seamlessly, without needing to introduce new templates. Message templates are computed as permutations of multiple sub-templates in the message, which allows the systems and methods to handle variations in message structure seamlessly and highly efficiently. These systems and methods are extendable to any domain using structured messages, and improve the efficiency of the systems that receive and act on information contained in messages.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
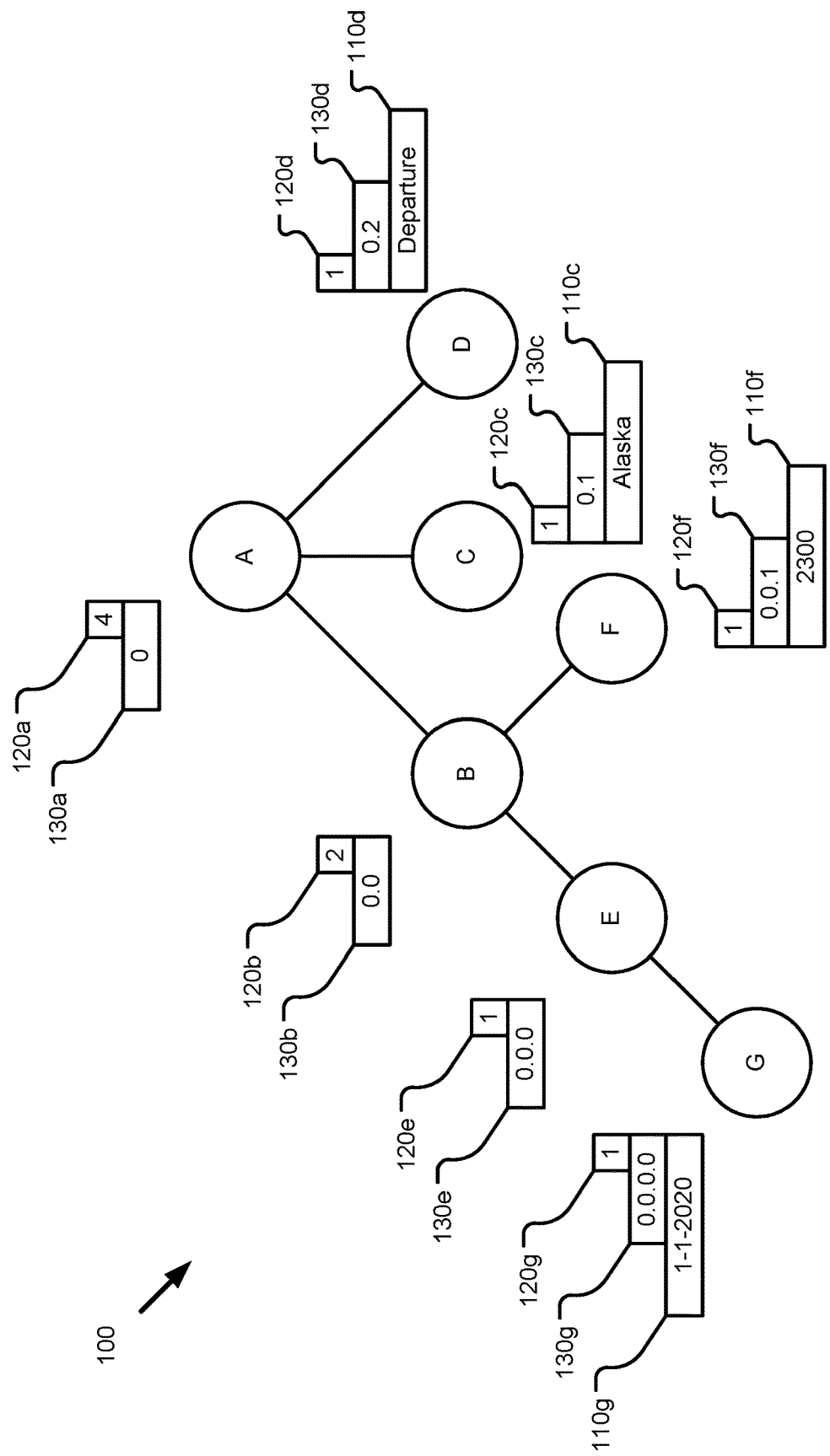
FIG. 1 illustrates an example email broken into a tree structure.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Examples are given herein in terms of email messages that are structured via the Hypertext Markup Language (HTML), but it will be understood that the present disclosure is applicable to any electronic message having a hierarchical structure for its content and that the examples given herein do not limit the present disclosure to email. Other structures for the electronic messages may include the Extensible Markup Language (XML), the JavaScript Object Notation (JSON), and the like.

A core region is identified in the email that contains information of interest, which may be distributed throughout the email and interspersed with areas that are not of interest, which is discovered according to sub-templates and a domain-specific dictionary. The domain-specific dictionaries may be built over time for different actionable information types, and may be applied to emails received from several different parties.

The tree-structure of HTML is exploited to represent the email as a tree, discarding styling information and HTML tags, and assigning unique identifiers to each node in the tree (e.g., the node with the identifier of 0.0.1.0 is a child of the node with the identifier of 0.0.1). Text nodes are leaves in the tree structure, and non-text nodes are branches in the tree structure, and these nodes are stored in a hash table. Styling information may include labels within a tag and the disclosed systems and methods may ignore any content labels within the tags so that present disclosure does not need to parse the contents of those tags. For example, the message may be formatted in HTML via tags as "<body><a href="https://www.contoso.com">Hello</a> World</body>" to provide text of "Hello" in the message as an active hyperlink to www.contoso.com and the text of "World," as plain text. The tags for <body> and <a> are recognized, and the labels of "body", "a", and "href=https://www.contoso.com" ignored within their tags so that two nodes are created; one for the body (0) and one for the hyperlink defined within the body (0.0).

While parsing the email, two hash tables are created to identify the core region. In the first hash table, the identifier of a branch node is the key, which points to an object storing information about that branch node's child nodes. In the second hash table, the identifier of a leaf node is the key that points to a value of the leaf node's text. In one aspect, the core region (the area of interest) is identified as the smallest sub-tree (i.e., with the fewest nodes) that contains all of the actionable information. Once a core region is identified, which is the lowest sub-tree from the root containing keywords of interest, the identifiers of the nodes in the sub-tree may be modified. For example, a sub-tree with an original Dewey ID of 0.1.0.1 for its root-most node will have its root-most node re-identified with a Dewey ID of 0 to be the root of the core region, and all child nodes will be identified according to the new root. The identifiers for all the nodes in the core region are then concatenated into a single string, which is used as the hash code for identifying the given core region.

The values of leaf nodes are compared to the domain dictionary to identify nodes containing keywords for actionable information (e.g., numbers formatted as times, days, months, airport codes). If a leaf node includes a term of interest from the domain dictionary, a score is incremented for that node and all of its parents (up to and including the root node). The scores are then used to identify the node furthest from the root node with the highest score, which represents the core region of the email. For example, due to the parent nodes inheriting scores from their child nodes, the node with the highest score and its parents may have the same score, in which case the node having the highest score and furthest from the root node is identified as the highest node in the area of interest. In other aspects, the highest node of the area of interest is set to be at least X tiers away from the root node.

The structure of the core region, that is, the number and relationships between its composite nodes allow for emails with shared structures to be identified quickly and their formats gleaned so that information of interest can be identified without needing to have any semantic meaning behind a keyword used by the system. The emails are broken into core regions that correspond to sub-templates, to reduce the amount of data needed to be stored and to allow for greater flexibility in identifying the overarching structure of an email, such that each core region is identifiable as one of the sub-templates comprising the overarching template for the email. The structures can be concatenated from the identifiers for their sub-templates such that if two emails have structures with the same identifiers, they may be considered to have the same structures.

It is noted that for a corpus of X emails having a corresponding corpus of Y templates, where X is greater than Y, if the number of emails becomes nX, the number of templates will increase sub-linearly, such that the number of templates is expected to be closer to Y than to nY. The relationship of X>Y in this assumption indicates that the sender of the emails uses one or more templates and that a sufficient number of emails have been received to identify at least a portion of the templates that the sender has available for use. In some aspects, the X emails are collected across multiple users' accounts so that the systems and methods described herein can more quickly collect a sufficiently large value of X emails to identify the templates, or users may specify that their messages may only be analyzed within a smaller context (e.g., within an organization, within an email domain, restricted to a given user account).

Templates may be grouped by a sending account or domain. For example, messages from help@contoso.com may have their templates identified separately from messages from sales@contoso.com or the senders using the @contoso.com domain may be grouped together but separately from senders using other domains. Alternatively, templates may be gathered across sending accounts and domains.

FIG. 1 illustrates an example email broken into a tree structure 100 having leaf nodes with keywords 110, node scores 120 and identifiers 130, and branch nodes having node scores 120 and identifiers 130. Each node is labeled with a letter and its associated keywords 110, node scores 120, and identifiers 130 (if present) are distinguished by including the labeled letter for the associated node as a suffix in the element number.

Keywords 110 are identified from a domain dictionary. The domain dictionary may grow as the systems and methods learn of new terms that represent actionable items. Keywords 110, for example, include but are not limited to: names and abbreviations thereof (e.g., for persons, cities, regions, airports); dates, holidays, and variations thereof (e.g., Monday, Mon., January, Jan, Christmas); times and various formats thereof (e.g., 8:00 pm GMT-6, 2000 EDT, Jan-1-2020, 1-Feb-2021, 3/3/23), significant words (e.g., "date", "delivery", "arrival").

Node scores 120 are calculated based on the presence of keywords 110 in a given node or its child nodes, such that a parent of two child nodes will have the combined node score 120 of its child nodes, and a grandparent node will have the node score 120 of the parent node plus the scores of any sibling nodes.

The identifier 130 for each node depends from the parent nodes as in a DeweyID arrangement as illustrated, but other identifiers 130 can be used in different aspects.

Figure 2:
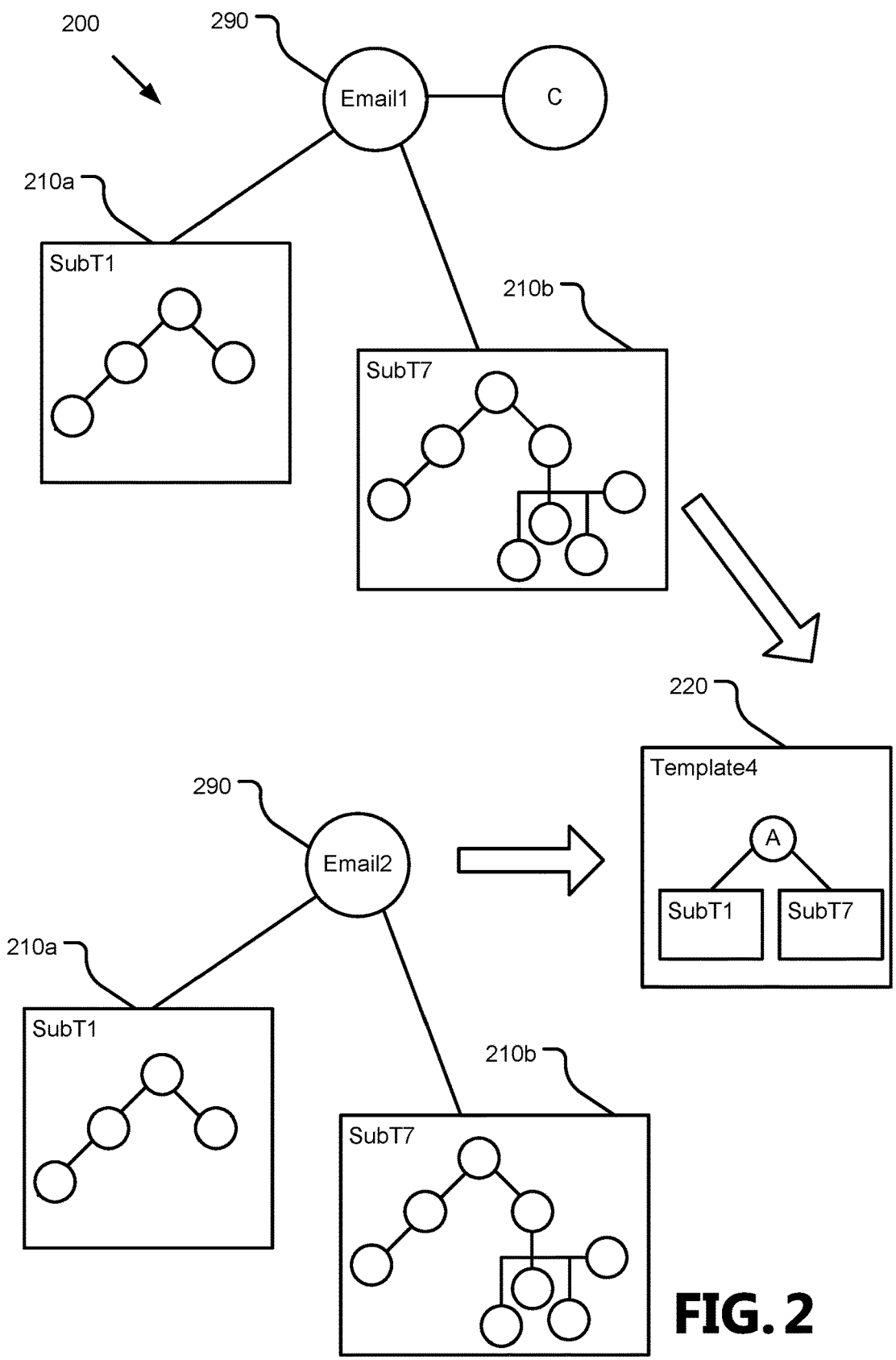
FIG. 2 illustrates an example identification using sub-templates.

FIG. 2 illustrates an example identification 200 using sub-templates 210. As illustrated, two emails 290 are received with minor variations between the emails 290, but due to the knowledge of the sub-templates 210 shared by the emails 290, both emails 290 can be mapped to one inclusive template 220 (also referred to as an ur-template 220). A major advantage in identifying and using sub-templates 210 is that it is simple and faster to extract information from a smaller sub-template 210 than from a relatively larger template 220. Another advantage is that even a minor change to the structure of an email 290 can result in a new structure for the ur-template 220, resulting in a larger number of templates 220 containing more data to be stored than systems and methods that make use of sub-templates 210.

Based on the template 220 identified from the arrangement of sub-templates 210, the actionable information and its purpose in the email 290 can be known. For example, the email 290 may contain two times that comprise actionable information for arrival and departure times. The sub-templates 210 and template 220 inform the system which of the two times is the arrival time and which of the two times is the departure time without having to parse the HTML structure for tags or other annotations related to identifiers for "arrival" or "departure".

Various feedback mechanisms may be put in place so that the informational order in the sub-templates 210 and templates 220 can be verified for accuracy, and the meaning of the data contained therein can be correlated across keywords 110.

Figure 3:
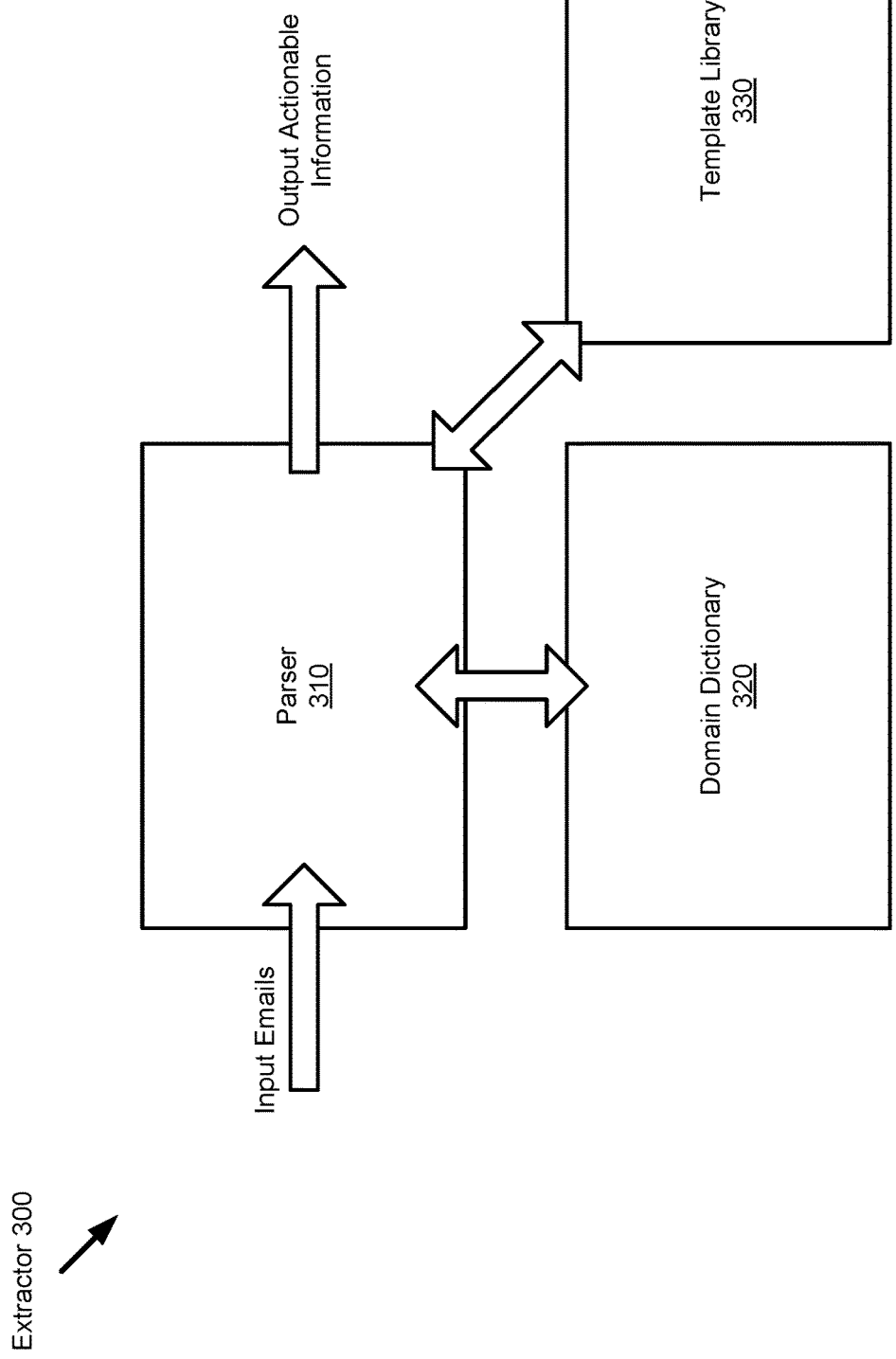
FIG. 3 illustrates an example extractor operable to extract actionable information from emails.

FIG. 3 illustrates an example extractor 300 operable to extract actionable information from emails 290. As illustrated, the extractor 300 includes a parser 310 to parse the emails 290 for keywords 110 that are present in a domain dictionary 320 so that the nodes comprising the email 290 can be assigned node scores 120 and the sub-template 210 comprising the email's template 220 can be identified from a template library 330 to aid in the extraction of the information of interest to the receiver quickly and more accurately.

The parser 310 is operable to break the email 290 into nodes, based on the structure of the email 290, and to parse the content of the email 290 for keywords 110 that are entries in a selected domain dictionary 320. As will be appreciated, breaking the email 290 into nodes based on its structure does not require the parser 310 to parse the tags of the structure, but rather the parser 310 may identify the start and the end of structural elements for the structure in which the email 290 was composed to identify a hierarchical structure of the message into which the nodes are arranged and depend from one another in a tree structure.

The parser 310 is further operable to assign node scores 120 based on identified keywords 110 in the nodes and child nodes of a parent node, and use the node scores and relationships to identify templates 220 and sub-templates 210 from the template library 330. One or more sub-templates 210 are identified based on portions of the area of interest sharing a similar structure to the sub-template 210 and having similar scores for the nodes. Templates 220 are identified based on combinations of sub-templates 210 identified based on the node scores 120 and arrangement of nodes within the tree structure for the area of interest, for example, via their hashes.

Sub-templates 210 that have previously been identified are stored in a template library 330. Additionally, the constructions of templates 220 from sub-templates 210 are stored in the template library 330. The extractor 300 uses the node scores 120 to identify the sub-templates 210 comprising the email 290 and compares the order of component sub-templates 210 to identify a template 220 from the library 330. When a sub-template 210 is identified that is not part of the library 330, it is added to the library 330 for later use. Similarly, when an arrangement of sub-templates 210 does not match a known template 220, that arrangement is added to the library 330 as a new template 220.

The identity of sub-templates 210 can be ascertained by their node scores 120 and the keywords 110 which they contain. For example, a first sub-template 210 with a node score 120 of X containing the keyword 110 "arrival" may be differentiated from a second sub-template 210 with a node score 120 of X not containing the keyword 110 "arrival" and from a third sub-template 210 containing the keyword 110 "arrival" but having a node score 120 of Y.

The domain dictionary 320 may be chosen from among several available domain dictionaries 320 based on user preference, sender identification (account or domain), detected language in the message (e.g., English, Spanish, Swahili, Chinese), or content in a message subject (e.g., a domain dictionary 320 for travel arrangement may be selected instead of a domain dictionary 320 for appointments when the subject includes the word "flight"). Domain dictionaries 320 may be specific to a given user or may be a general purpose domain dictionary 320 available to multiple users.

The domain dictionary 320 may initially include a seed list of keywords 110, but may be automatically or manually expanded to include additional keywords 110. Keywords 110 that are automatically added to the domain dictionary 320 may be identified from the area of interest that are not already keywords 110. For example, if a domain dictionary 320 initially included keywords 110 for doctor appointments, but did not include the doctor's name, the domain dictionary 320 may be expanded to include the doctor's name in response to the doctor's name being present in the area of interest of the email. Such expansions may be limited to domain dictionaries 320 specific to a given user (e.g., a first user's doctor may have a different name than a second user's doctor) or may be added to a general purpose domain dictionary 320. In various aspects, a new keyword 110 will need to be seen X times in the area of interest to be automatically added to a domain dictionary 320, where X is a number configurable by a user or administrator.

Figure 4:
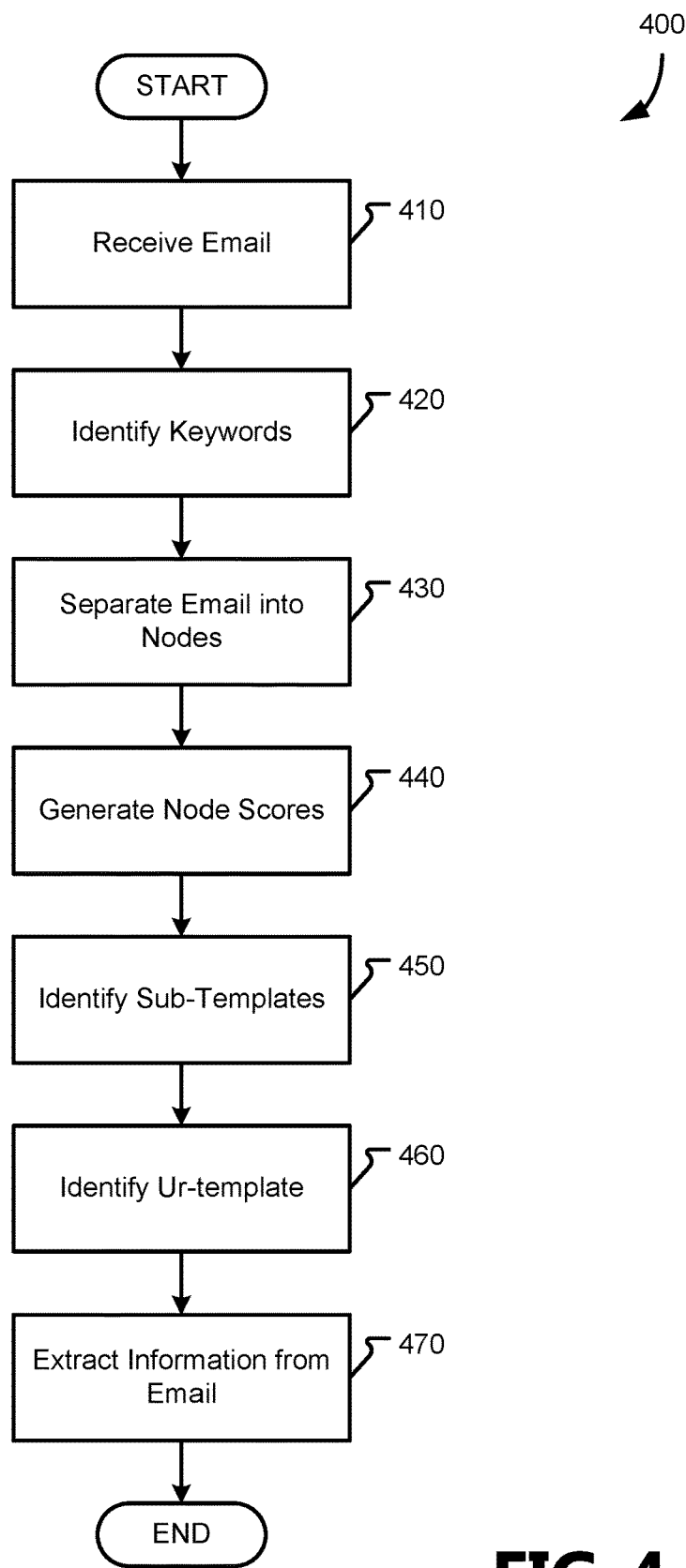
FIG. 4 is a flow chart showing general stages involved in an example method for extracting actionable information from an email

FIG. 4 is a flow chart showing general stages involved in an example method 400 for extracting actionable information from an email. Method 400 beings at OPERATION 410 when an email is received. Method 400 proceeds to OPERATION 420 where the email is parsed for keywords 110 from a domain dictionary 320.

The email is then separated into nodes based on its underlying structure at OPERATION 430 and node scores 120 for those nodes are generated at OPERATION 440. As will be appreciated, an HTML structure identifies the start of an element with either a tag bracketed with "<" and ">" around a label and ends an element with an equivalent label bracketed with "</" and ">" or as a single tag element starting with "<", including one or more labels, and ending with "/>". For example, the element "<b> bold text</b>" designates that the text between the tags (i.e., "bold text") is to have a bold format applied thereto and the element "<img=example.gif />" designates that the file "example.gif" is to be included as an image. Tags may be either presented inline or at a block-level, separated by one or more lines, include one or more labels, and may include several tags therein as sub-nodes. One of ordinary skill in the art will be familiar with the structure and tags used in various version of HTML and will understand that the above are given as non-limiting examples; other structures are possible in HTML and different structures (XML, JSON, etc.) may also be used. Each identified node is assigned a node score 120 based on the inclusion/presence of at least one keyword 110 within the element comprising a node and the node scores 120 of sub-nodes included in the node.

The node scores 120 are used to identify the area of interest in the email, and the structure of the nodes in the area of interest, along with their node scores 120, are used to identify sub-templates 210 at OPERATION 450. The structure of the nodes are compared to known sub-templates 210 to find matching sub-templates 210 from which the area of interest is constructed. The identified sub-templates 210 and their relationships to each other (e.g., dependencies, order of presentation in the area of interest, relative node scores 120) are used to identify a template 220 to which the area of interest belongs at OPERATION 460. As will be appreciated, a template 220 may include nodes that are not included in a sub-template 210 or multiple sub-templates 210 so that a closest-match template 220 is identified as the template 220 for the email 290 despite not being an exact match.

Once the template 220 for the email 290 has been identified, method 400 proceeds to OPERATION 470 where the actionable information is extracted from the area of interest in the email 290 based on the structure of the email 290 (i.e., its template 220 and sub-templates 210) and the keywords 110 included in the nodes. In various aspects, the actionable information that is extracted is transmitted to another program for use therein (e.g., a personal digital assistant, a calendar application, an email application). Method 400 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
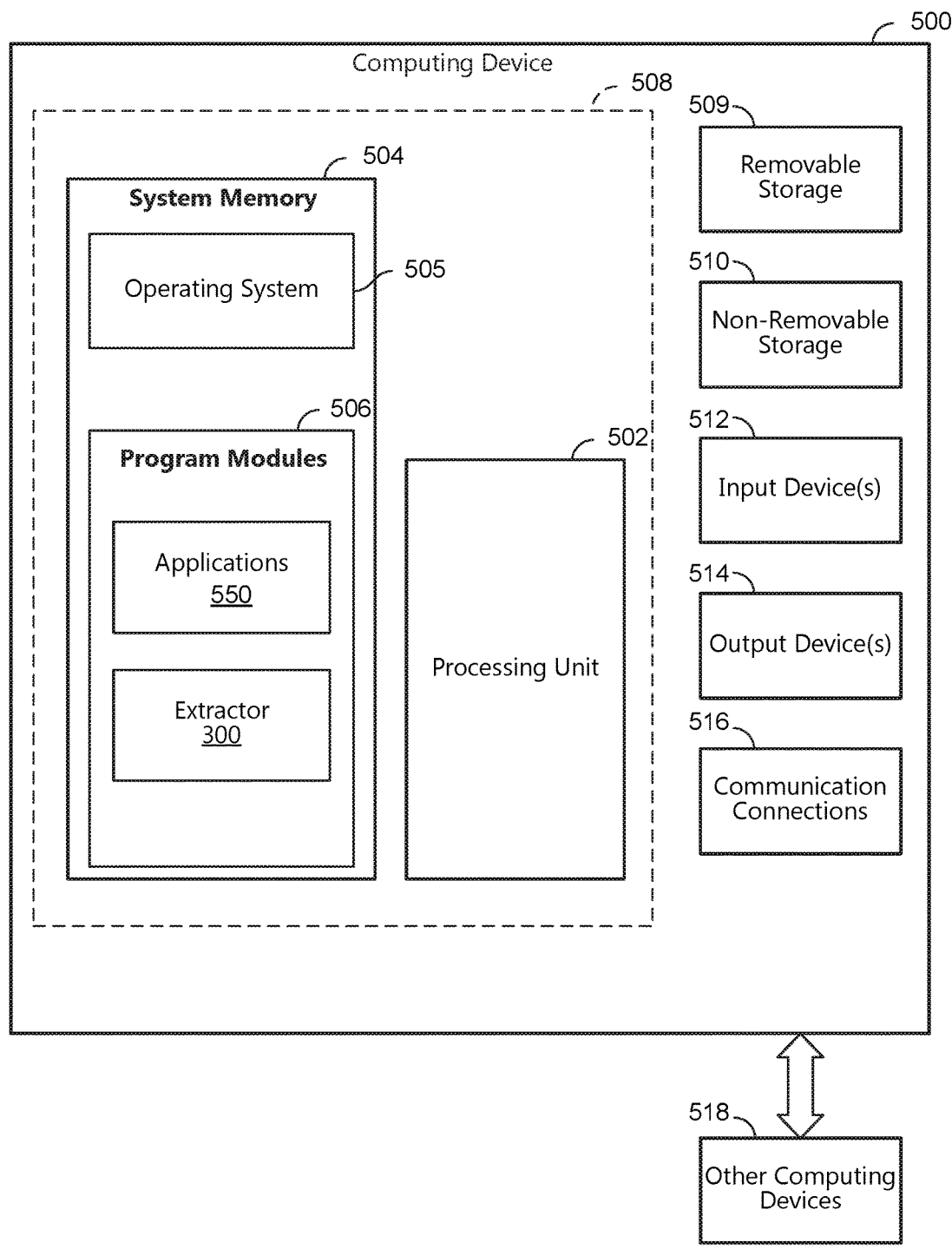
FIG. 5 is a block diagram illustrating example physical components of a computing device.
Figure 6A:
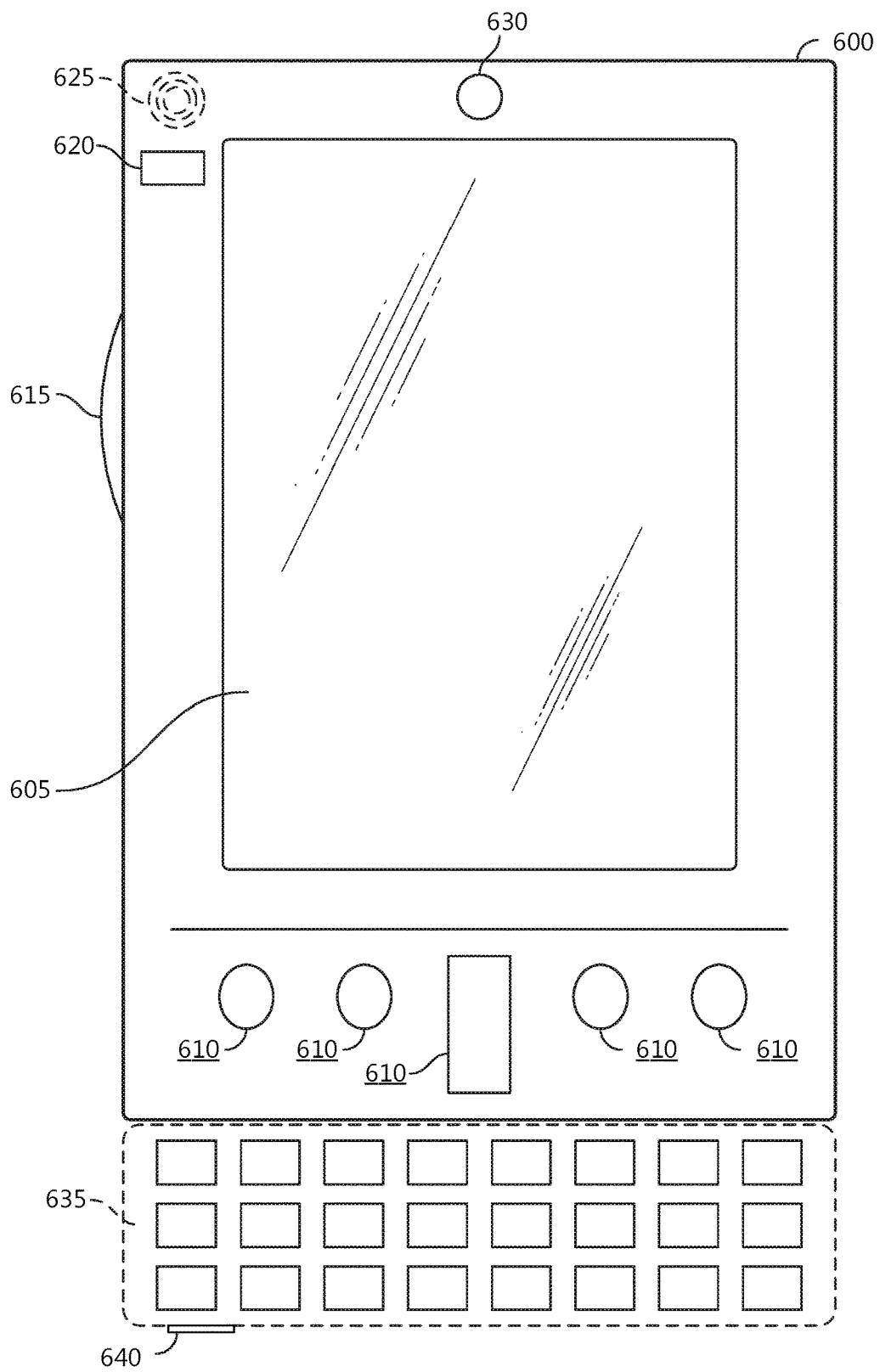
FIGS. 6A and 6B are block diagrams of a mobile computing device.
Figure 6B:
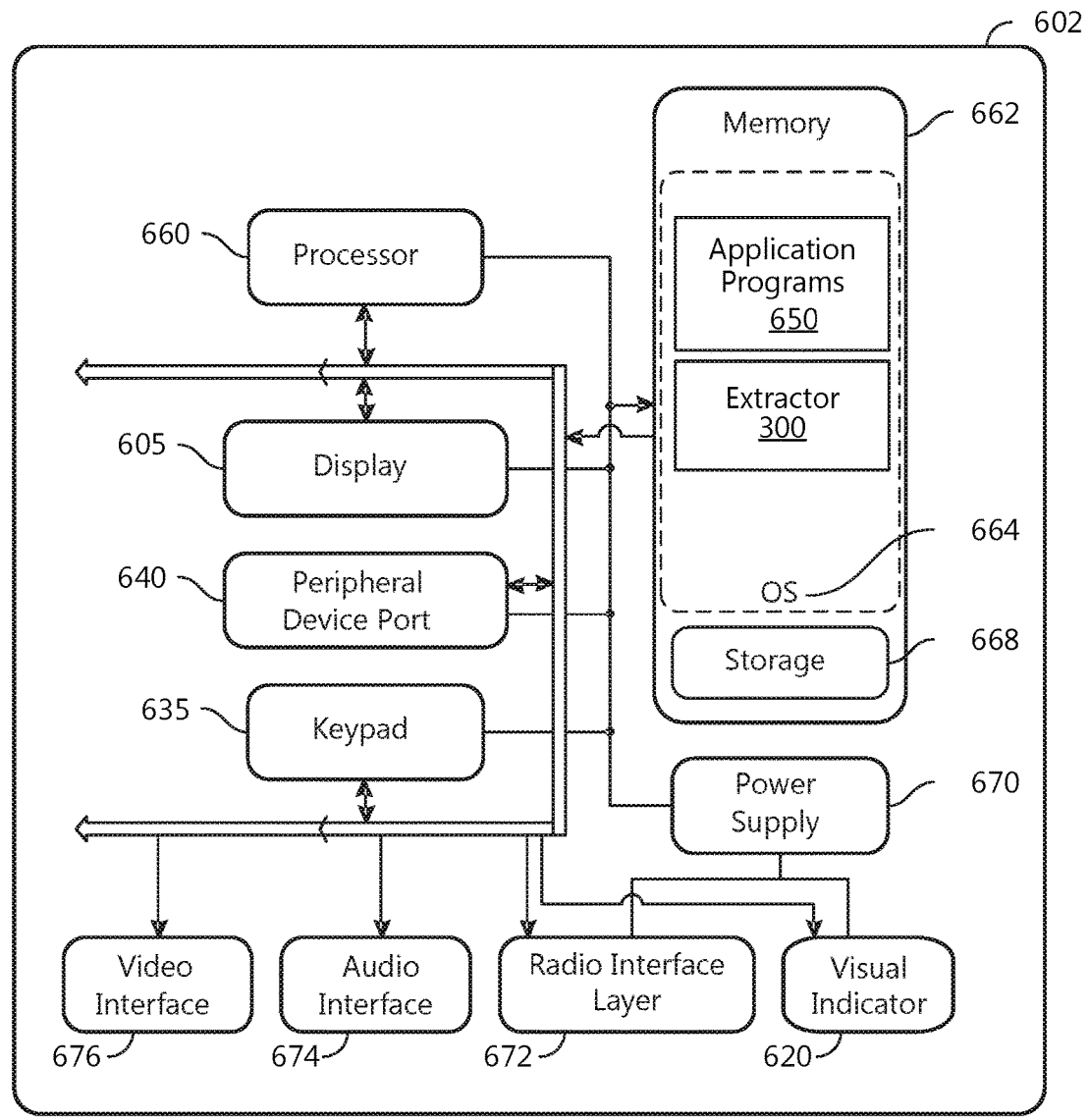
Figure 7:
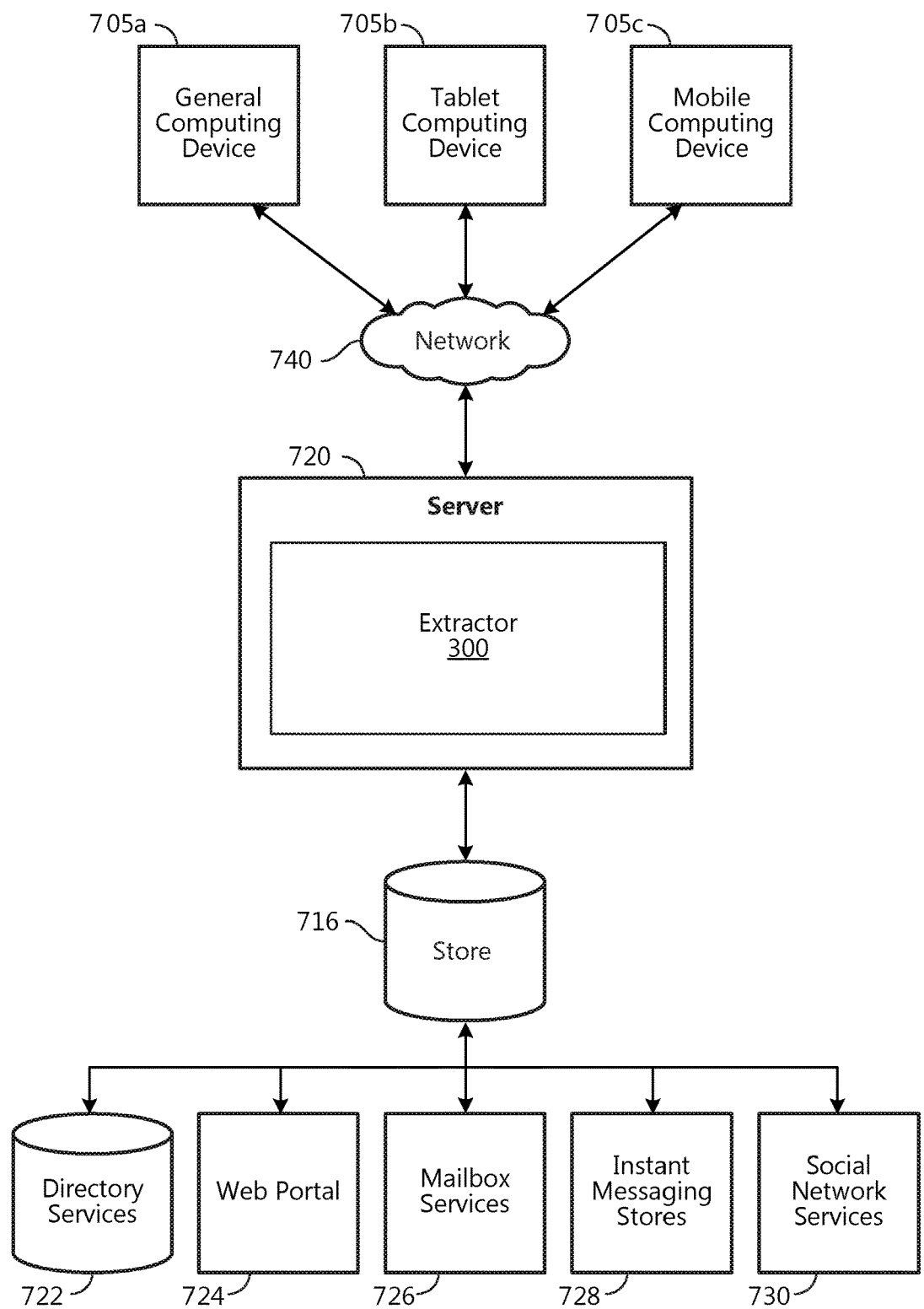
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes an extractor 300. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., an extractor 300) perform processes including, but not limited to, one or more of the stages of the methods discussed herein. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, an extractor 300 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for extracting actionable information as described above. Content developed, interacted with, or edited in association with the extractor 300 is enabled to be stored in different communication channels or other storage types. For example, various documents may be stored using a directory service 722, a web portal 724, a mailbox service 726, an instant messaging store 728, or a social networking site 730. The extractor 300 is operative to use any of these types of systems or the like for extracting actionable information, as described herein. According to an aspect, a server 720 provides the extractor 300 to clients 705a,b,c. As one example, the server 720 is a web server providing the extractor 300 over the web. The server 720 provides the extractor 300 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for improving efficiency of a computing device used in extracting actionable information from a message, comprising:
   receiving a hierarchically structured message having text content;
   parsing the message;
   identifying one or more keywords from a dictionary in the parsed message;
   separating the message into nodes;
   generating node scores for the nodes, wherein the node scores are generated by: incrementing a given node score based on the given node containing at least one keyword; and adding the node scores of direct child nodes of a particular parent node to a node score associated with the particular parent node;
   identifying an area of interest based at least in part on the node scores;
   correlating the area of interest to one or more sub-templates;
   identifying a template based on the one or more sub-templates; and
   extracting actionable information from the message based on the identified template.

2. The method of claim 1, wherein the message is an email message formatted according to the Hypertext Markup Language.

3. The method of claim 1, further comprising:
   identifying a language of the parsed message; and
   selecting the dictionary based on the identified language.

4. The method of claim 1, wherein the message is separated into nodes based on the hierarchical structure in which the message is composed.

5. The method of claim 1, wherein the given node has the highest node score that is selected from the nodes scores at least a set number of tiers below a root node.

6. The method of claim 1, wherein correlating the area of interest to the one or more sub-templates further comprises:
   determining whether portions of the area of interest match one or more existing sub-templates;
   in response to determining that a given portion of the area of interest matches a given existing sub-template, selecting the given sub-template; and
   in response to determining that the given portion of the area of interest does not match the one or more existing sub-templates, saving the given portion as a new sub-template.

7. The method of claim 1, wherein the actionable information extracted from the message is added to the dictionary.

8. The method of claim 1, further comprising transmitting the extracted actionable information to one of:
a personal digital assistant; or
a calendar application.

9. A system for improving efficiency of a computing device in extracting actionable information from a message, comprising:
a parser, operable to receive a hierarchically structured message having text content and operable to break the message into nodes based on the hierarchical structure of the message, wherein the nodes are organized according to a tree structure corresponding to the hierarchical structure;
a domain dictionary, in communication with the parser;
a template library, in communication with the parser;
wherein the parser is further operable to identify keywords in nodes of the message matching entries in the domain dictionary and assign node scores to each of the nodes based on keyword presence;
wherein the parser is further operable to identify an area of interest in the message, the area of interest comprising a parent node and a child node of the parent node, based on the child node having a highest node score that is furthest from a root of the tree structure;
wherein the parser is further operable to identify a template for the message from the template library, wherein the template library is built based on identifying tree structures and node scores from one or more areas of interest identified in previous messages; and
wherein the parser is further operable to extract actionable information from the area of interest based on the template.

10. The system of claim 9, wherein the extracted actionable information is transmitted to a personal digital assistant and integrated into a calendar application.

11. The system of claim 9, wherein the keywords include:
names;
dates;
holidays; and
times.

12. The system of claim 9, wherein the domain dictionary is selected from a plurality of domain dictionaries based on a sender of the message.

13. The system of claim 9, wherein the domain dictionary is built based on text included in the area of interest.

14. A computer readable storage device including instructions, which when executed by a processor are operable to:
defining a plurality of nodes of an email message, the plurality of nodes arranged in a tree structure based on a structure of the email message;
parse the email message according to a domain dictionary to identify keywords from the domain dictionary included in leaf nodes in the tree structure;
increment a node score for each leaf node that includes at least one keyword;
combine node scores of each child node of the tree structure at a parent node;
identify a node in the tree structure having a highest node score;
define the node having the highest node score and child nodes of the node having the highest node score as an core region in the email message;
identify one or more sub-templates having tree structures and node scores matching tree structures and node scores of one or more portions of the core region;
identify an ur-template that includes the one or more sub-templates; and
extract actionable information from the core region based on the ur-template.

15. The computer readable storage device of claim 14, wherein when the highest node score is shared by multiple nodes, a node of the multiple nodes sharing the highest node score located furthest from the root node in the tree structure is selected as the node with the highest node score.

16. The computer readable storage device of claim 14, wherein when the tree structures and the node scores of the one or more portions of the email message do not match a known sub-template, the tree structures and the node scores of the one or more portions are saved as new sub-templates.

17. The computer readable storage device of claim 14, wherein the structure of the email message is formatted according to Hypertext Markup Language and the nodes and the tree structure are determined based on tags of the elements.

18. A method for improving efficiency of a computing device used in extracting actionable information from a message, comprising:
receiving a hierarchically structured message having text content;
parsing the message;
identifying one or more keywords from a dictionary in the parsed message;
separating the message into nodes;
generating node scores for the nodes;
identifying an area of interest based at least in part on the node scores, wherein the identified area of interest comprises a given node having a highest node score, wherein when the highest node score is shared by multiple nodes, a node of the multiple nodes sharing the highest node score located furthest from a root node is selected as the node with the highest node score;
correlating the area of interest to one or more sub-templates;
identifying a template based on the one or more sub-templates; and
extracting actionable information from the message based on the identified template.

19. A method for improving efficiency of a computing device used in extracting actionable information from a message, comprising:
receiving a hierarchically structured message having text content;
parsing the message;
identifying one or more keywords from a dictionary in the parsed message;
separating the message into nodes;
generating node scores for the nodes;
identifying an area of interest based at least in part on the node scores;
correlating the area of interest to one or more sub-templates, wherein correlating the area of interest to the one or more sub-templates further comprises:
determining whether portions of the area of interest match one or more existing sub-templates;
in response to determining that a given portion of the area of interest matches a given existing sub-template, selecting the given sub-template; and
in response to determining that the given portion of the area of interest does not match the one or more existing sub-templates, saving the given portion as a new sub-template;
identifying a template based on the one or more sub-templates; and extracting actionable information from the message based on the identified template.

\* \* \* \* \*